United States Patent [19]
Hurst et al.

[11] Patent Number: 5,204,528
[45] Date of Patent: * Apr. 20, 1993

[54] SYSTEM FOR DETERMINING HEALTH RISK DUE TO RADON PROGENY AND USES THEREOF

[75] Inventors: George S. Hurst; Harvel A. Wright, both of Knoxville, Tenn.; Philip K. Hopke, Potsdam, N.Y.

[73] Assignee: Consultec Scientific, Inc., Knoxville, Tenn.

[*] Notice: The portion of the term of this patent subsequent to Jun. 25, 2008 has been disclaimed.

[21] Appl. No.: 667,434

[22] Filed: Mar. 11, 1991

Related U.S. Application Data

[63] Continuation-in-part of Ser. No. 364,209, Jun. 9, 1989, Pat. No. 5,026,986.

[51] Int. Cl.$^5$ .................................................. G01T 1/00
[52] U.S. Cl. ..................................... 250/255; 250/253; 250/435
[58] Field of Search .............. 250/253, 255, 370.02, 250/370.06, 435, 364

[56] References Cited

U.S. PATENT DOCUMENTS

| | | | |
|---|---|---|---|
| 2,892,091 | 6/1959 | Sawle | 250/364 |
| 3,502,876 | 3/1970 | Lasseur | 250/370.02 |
| 3,555,278 | 1/1971 | Schroeder | 250/435 X |
| 3,922,555 | 11/1975 | Chapuis et al. | |
| 4,055,762 | 10/1977 | Durkin | 250/253 |
| 4,185,199 | 1/1980 | Droullard et al. | 250/435 |
| 4,567,939 | 2/1986 | Dumbeck | |
| 4,700,067 | 10/1987 | Carossi et al. | 250/370.02 X |
| 4,726,824 | 2/1988 | Staten | |
| 4,773,309 | 9/1988 | Walters | |
| 4,776,385 | 10/1988 | Doss | |
| 4,871,914 | 10/1989 | Simon et al. | |
| 4,888,485 | 12/1989 | Becker et al. | 250/370.06 |
| 4,891,514 | 1/1990 | Gjerdrum et al. | 250/255 |
| 4,983,843 | 1/1991 | Thomson | 250/370.02 |
| 5,026,986 | 6/1991 | Hurst | 250/255 |
| 5,053,624 | 10/1991 | Kronenberg | 250/255 X |

FOREIGN PATENT DOCUMENTS

| | | | | |
|---|---|---|---|---|
| 58-99630 | 6/1983 | Japan | | 98/42.04 |
| 6488285 | 9/1987 | Japan | | 250/393 |
| 141553 | 10/1960 | U.S.S.R. | | 250/364 |

Primary Examiner—Constantine Hannaher
Assistant Examiner—Edward J. Glick
Attorney, Agent, or Firm—Pitts and Brittian

[57] ABSTRACT

A system for determining the health risk, due to alpha emitters attached to particles of various sizes, these alpha emitters being due to the level of radon, to persons within an environment where radon may be present. In one embodiment, a sample of air is passed through a filter element having a collection characteristic such that essentially all particulate material, with their associated radon progeny, is removed from the air. The alpha particles emitted by the decay of these radon progeny are detected with an appropriate alpha particle spectrometer. The realtime resolving of the energies of individual of the daughter atoms permits a determination of the working level or PAEC associated with the radon. In those instances where lung dose is to be determined, the filter element has two portions. The first portion is designed to remove particles in a manner like that which occurs in the human nasal passage. The second portion of the filter element is designed to simulate the collection of particles by the lungs. An analysis of the energies of the alphas emitted from the radon progeny collected on the second portion is used to compute the lung dose. Either of the embodiments can be used to provide a signal that would be used for the operation of any radon mitigation equipment associated with the environment. Other uses for the resultant signals are discussed.

8 Claims, 4 Drawing Sheets

SYSTEM FOR DETERMINING HEALTH RISK DUE TO RADON PROGENY AND USES THEREOF

This is a Continuation-in-Part application based upon parent application Ser. No. 07/364,209, filed Jun. 9, 1989, and now U.S. Pat. No. 5,026,986, issued Jun. 25, 1991.

DESCRIPTION

1. Technical Field

This invention relates to a system which analyzes daughter atoms, e.g., $^{218}$Po and $^{214}$Po, that result from the decay of $^{222}$Rn to determine working level (PAEC) and/or the dose to the tracheobronchial or other air passages (this dose being generally referred to as "lung dose") of a person inhaling these potentially hazardous materials. The system can determine if the radon level in an environment has exceeded a preselected threshold level, and can include a control to activate a radon-mitigation device such as a vent, a fan, a subsurface exhaust or an appropriate portion of a HVAC system.

2. Background Art

Modern energy conservation practices in residential and commercial environments have created a potential for high levels of radon gas to which building occupants are exposed. Naturally occurring $^{238}$U eventually decays to $^{226}$Ra with a half-life of 1620 years. This decay product further decays to $^{222}$Rn with a half-life of 3.8 days. There are various routes, such as diffusion through the ground and through basement walls, for $^{222}$Rn to enter buildings occupied by people. There are widely held beliefs that the levels of radon in buildings are such that the $^{222}$Rn decay progeny, e.g., the radioactive daughter atoms (polonium-218 and polonium-214) are producing lung and other cancers. In particular, these airborne decay products are deposited in the respiratory tract such that their subsequent decay leads to a dose to the sensitive tissues, such as the bronchial epithelium. In order to minimize a health risk to occupants of a building, the Environmental Protection Agency currently recommends that the radon level not exceed 4 pCi/L.

When radon gas is present in a building, a series of complex processes is involved in placing the occupants at risk. It is believed that the most serious threat to human health is that of lung cancer due to the deposition of alpha-emitting daughter atoms of radon within the bronchial or other air passages of the person. These are $^{218}$Po emitting 6.0 MeV alpha particles with a half-life of three minutes and $^{214}$Po emitting 7.7 MeV alpha particles with a half-life of 150 microseconds. In this radium decay chain there are intervening beta decay processes of somewhat longer half-lives so that the effective half-life in going from $^{218}$Po to $^{210}$Pb is about 40 minutes. The product $^{210}$Pb is a beta emitter with a half-life of 22 years in decaying to $^{210}$Bi and to $^{206}$Pb that terminate the chain.

In a static room, the time required for the daughter atoms to diffuse to the walls would be much longer than the decay time of 40 minutes. If the daughter atom is attached to atmospheric gases or dust particles, this diffusion time is even longer. However, if the heating, ventilating and air conditioning (HVAC) system is operating, the circulation time of air through the system is typically about 20 minutes; thus, the daughter atoms would be partially filtered. Such filtering, however, removes little of the radon gas ($^{222}$Rn) with a half-life of 3.8 days; thus, the shortlived daughter atom $^{218}$Po comes quickly back into equilibrium with the radon. While the home filtering system could have some value in reducing the level of $^{214}$Po, it will be of little value for filtering the $^{218}$Po.

There are a number of factors which can determine the level of radon in a building. The rate of diffusion of radon into a building depends on the building location, type of soil, weather and seasonal variations, the design of the building and its maintenance. For instance, small cracks developing in a basement wall as the building ages can change the rate of entry. Even at a constant rate of entry, there are a number of housekeeping factors such as the amount of ventilation, the number of times the doors are opened, and the type of heating system and its schedule of use which can alter the level of radon. When these factors which control the level of radon itself are considered with other factors, such as room humidity and dust content (which both control the fate of the daughter atoms) it can be seen that the health risk cannot reliably be tracked by an occasional sample of the radon level in the building.

In certain mining operations, workers can also be exposed to the daughter products of $^{220}$Rn which originates from $^{232}$Th. In this case even the short-lived (54 sec.) $^{220}$Rn can enter the air breathed by workers and create therein alpha-emitting daughter atoms. Certain features of the present invention are useful in this situation as further described herein.

The level of radon decay products is referred to in many terms, including "working level" or the "potential alpha energy concentration" (or PAEC). The PAEC value for any situation is determined by monitoring the activities for all of the airborne daughter products.

For a better estimate of health effects, it is desirable to determine the absorbed dose to the sensitive portions of the respiratory tract in persons who are potentially subjected to the damaging daughter products. Thus, it is necessary to have some means for collecting all particles containing the radiation as well as distinguishing those particles that can lodge in these sensitive portions: the most sensitive portion being the tracheobronchial regions of the respiratory track. This is due to the fact that large particles deposit on surfaces within the nose and other upper portions of the breathing passages by impaction, and extremely small particles deposit by diffusion. Small particles that penetrate through the nasal cavity diffuse across the air stream to deposit on the surface of the bronchial epithelium. Particles in the 2 to 20 nm size are the most critical to the potential induction of lung cancer. This is a somewhat simplified description of the problem as researchers have actually divided the air passages into a large number of regions, with each region giving rise to a collection of the damaging particles and their effect. However, there is general agreement that the tracheobronchial region is the most critical for the induction of lung cancer.

Accordingly, it is an object of the present invention to provide a simple, accurate and low cost device for realtime monitoring and controlling the level of radon in homes and other environments, for determining dose to the sensitive portions of the respiratory tract of occupants and for determining the PAEC levels within specified environments.

Moreover, it is an object of the present invention to provide such a radon decay product detector coupled with a control system that keeps the average radon level below a guideline or preselected threshold level in a manner which is consistent with reasonable energy conservation practices.

These and other objects and advantages of the present invention will become apparent upon a consideration of the following drawings and a complete description thereof.

DISCLOSURE OF THE INVENTION

In accordance with the present invention, there is provided a system for detecting and determining radon-induced health risk to individuals, particularly within a building-type environment, on a real-time basis. Further, if desired, this system provides for controlling the level of radon (and its daughter atoms) in the building through the operation of mitigation means. The system of the present invention is based upon the collection and the detection of radon by monitoring radon progeny; namely, $^{214}$Po and $^{218}$Po, which are commonly referred to as daughter atoms. The collection is achieved by interposing an appropriate filter means in an air stream that is drawn from the environment. The level of each of these two types of atoms retained on the filter means can be determined with electrical detectors such as pulse ionization chambers or solid state particle detectors as part of an alpha particle spectrometer. Further, these devices can be used to identify separately the two types of daughter atoms since the alpha particle energies differ and are, respectively, 6.0 MeV and 7.7 MeV.

In one embodiment of the system, there is a detector that provides information as to the level of the daughter atoms in terms of the potential alpha energy concentration (PAEC). This sensor is much more sensitive for indirectly determining radon level than is the measurement of $^{222}$Rn itself. Further, the PAEC is more directly related to health hazards than is the radon gas. A second embodiment provides for determining dose due to alpha particle energy deposition in the lung by simulating particulate collection by the lungs. Although this device is less sensitive than the sensor for PAEC level determination, it is still far more sensitive than a direct $^{222}$Rn detector. By combining the use of the two detectors, further benefits of health risk determination are gained. Further, the sensor for PAEC and lung dose can also be used to help protect workers in mines where exposure may be due to both $^{220}$Rn and $^{222}$Rn. It should be noted that while the interpretation of PAEC from the measured quantities depends upon the decay scheme lung dose simulation does not.

BEST MODE FOR CARRYING OUT THE INVENTION

The present invention is closely related to that disclosed and claimed in the aforementioned U.S. Pat. No. 5,026,986 issued to the common assignee of the present invention. Thus, the material contained in that patent is incorporated herein by reference. In that patent, the thrust was to obtain information related to the quantity of radon progeny in an environment through the use of an alpha particle spectrometer whereby the various daughter atoms are identified by their individual energy of the alpha particles emitted in their decay. By analyzing these spectra the quantity of radon was inferred, and actions could be taken to mitigate that radon level.

The thrust of the present invention is to provide unique sensors to be used in mitigation systems. These sensors are based on the biologically meaningful quantity potential alpha energy concentration (PAEC) or, better, the actual lung dose due to radon progeny. Accordingly, a control system based on the use of PAEC level detectors or lung dose sensors is described. However, it must be recognized that, currently, the U.S. EPA recommends remedial action based on actual radon concentration in the air. As stated above, the EPA recommendation is now set at 4 pCi/L of $^{222}$Rn. Thus, the disclosed system based upon radon progeny data also provides means to convert the radon progeny measurements of PAEC to an approximate radon concentration. This has a decided advantage over the direct measurement of radon by conventional methods; namely, the PAEC measurement is many orders of magnitude more sensitive because large volumes of air can be sampled. It is known that estimates of an activity concentration of $^{222}$Rn level can be made by assuming an appropriate equilibrium between the activity concentration and the $^{222}$Rn concentration. A ratio of 0.25 may be used as a conservative value for protection purposes.

A more accurate determination of radon may be obtained from following the quantity of $^{218}$Po as determined with the sensors. This is because of the short half-life (three minutes) of this radon daughter such that it is quickly back in equilibrium in the system. Thus, this daughter atom will respond much more quickly to changes in the radon level.

Figure 1:
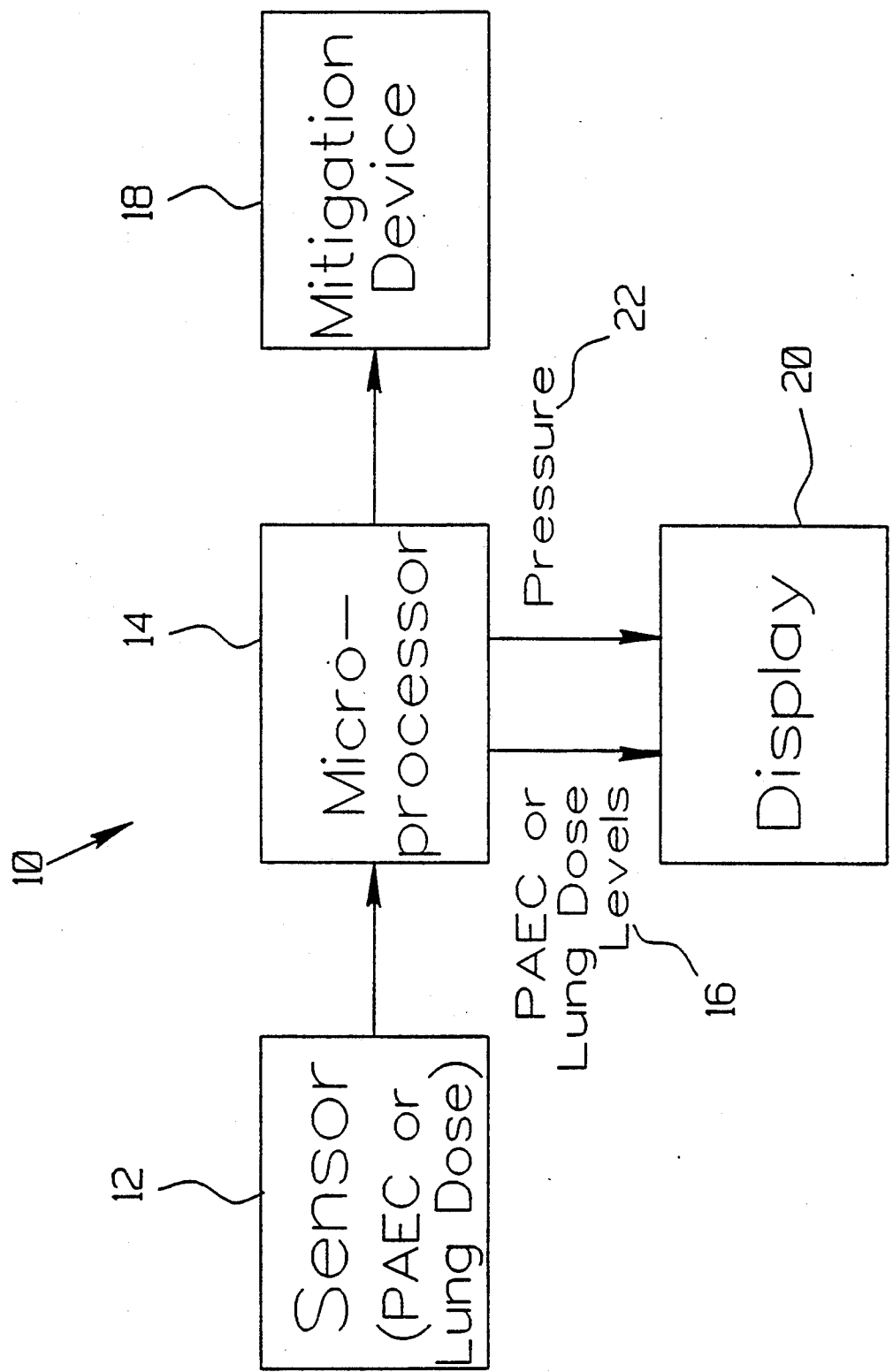
FIG. 1 is a schematic block diagram of a system for the mitigation of radon and radon progeny levels in an enclosed environment in which the sensor of the hazard to human health can be based on either PAEC or lung dose.

The various embodiments of the present invention are illustrated in FIGS. 1 through 5. Referring first to FIG. 1, shown therein is a schematic block diagram of one embodiment of the present invention indicated at 10. It is constructed in accordance with various features of the present invention as described in more detail hereinafter. This embodiment 10 can be configured as a stand-alone unit to measure quantities related to health risks associated with ambient radon levels in a building or can be configured to be a portion of other equipment needed for building air processing equipment, for example, to reduce these radon levels.

This system 10 has a sensor 12 that is responsive to alpha particles emitted during the decay of the radon progeny. This sensor is an electrical alpha particle spectrometer having, for example, a solid state detector to detect the alpha particles. The output of the detector is a pulse whose amplitude varies according to energy. Normally the pulse amplitudes are directly proportional to alpha particle energy and thus can resolve separately the $^{218}$Po and $^{214}$Po. The output of the sensor 12 is fed into a microprocessor 14 that is programmed to generate a signal related to either PAEC or lung dose 16, depending upon the particular form of the sensor 12. This value of the PAEC or lung dose can be used in several ways. For example, the microprocessor can determine if the levels exceed a safe level in an environment (building), and then send a signal to a mitigation device 18 to cause a reduction of radon (and radon progeny) in the building. This mitigation device can be, for example, a vent, a fan or any of the other forms of radon reduction as known in the art. Also, the PAEC level or lung dose information can be inputted to a display 20 which can contain recording means if desired.

As particulates are deposited within the collection element of the sensor, there will be a point at which the amount of deposit will obstruct air flow through the sensor. This obstruction in air flow would be related to the increase in pressure across the collection element of the sensor. A signal to this effect can be generated at 22 and conveyed to the display 20 or any desired monitor. In some types of collection elements, the accumulation of particles will result in self absorption of the daughter atoms. The data processor can, however, be programmed to detect the energy shifts and can automatically compensate for these shifts. Alternatively, a signal can be generated to indicate a need to service the collection element.

Although there are applications where one or the other of the PAEC level and lung dose information is desired (as obtained with the embodiment of FIG. 1), there are many applications where it is desirable to simultaneously obtain information about both the PAEC level and the lung dose. An embodiment for this purpose is shown in a schematic block diagram at 10' in FIG. 2. As shown, there is a PAEC sensor 12A and a lung dose sensor 12B of the same type as described above with respect to FIG. 1. That is, each is a solid state alpha particle detector coupled to an electrical alpha particle spectrometer. The outputs of both sensors 12A and 12B are fed to a microprocessor 14' that is programmed to generate individual outputs as to the PAEC level 16A and lung dose 16B. Both of these can be sent continuously to a mitigation device 18', or only when their values exceed some predetermined level indicating that the radon concentration has been exceeded. As in the embodiment of FIG. 1, the PAEC and lung dose (and any other information generated by the microprocessor 14') can be transmitted to a display 20'. The microprocessor 14' can also be programmed to generate a signal at 24 corresponding to the radon level in the building in order to be compared to the EPA maximum concentration value. This, too, can be used to drive the mitigation device 18'.

Figure 2:
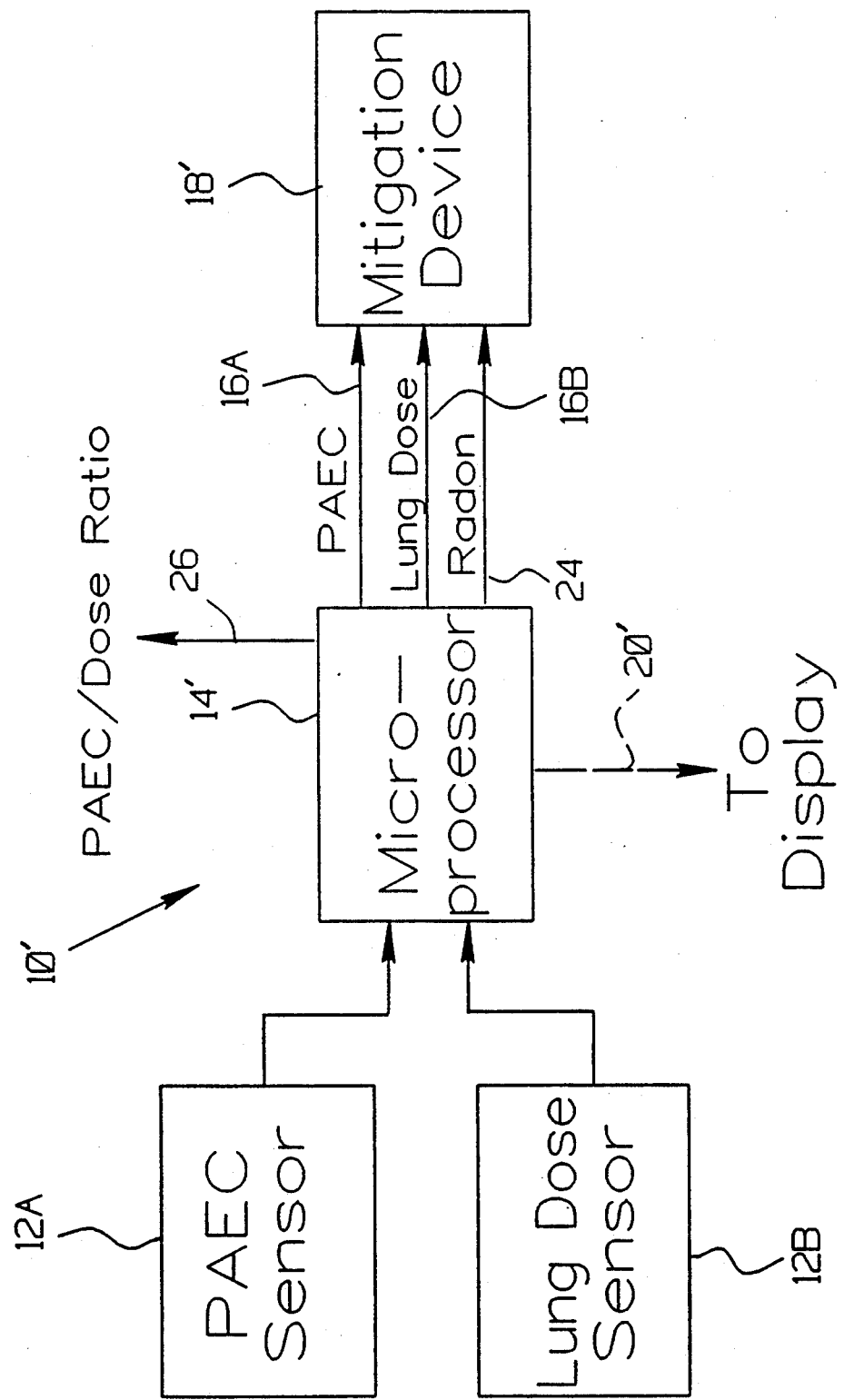
FIG. 2 is a schematic block diagram of a system for simultaneously measuring both PAEC levels and lung dose in order to control mitigation of radon and radon progeny levels in an enclosed environment.

Another important feature of the embodiment 10' shown in FIG. 2 is that of generating a ratio of the PAEC level to that of the lung dose information, as at 26. This ratio can be used for several purposes. For example, over a relatively long time period for any given application the ratio will remain reasonably constant even though there may be short-term fluctuations of the ratio due to events in the environment. If, however, the ratio is found to gradually change over time, this is an indication that there is likely to be a change in the performance of one of the sensors. Thus, a monitoring of this ratio will give an insight into the functioning of the device.

As will be discussed in greater detail hereinafter, the detector for lung dose information is sensitive to the size of particles onto which the radon progeny become attached. Thus, through calibration and microprocessor memory utilization, the ratio of the two detector outputs can be used to ascertain information about particle size distribution in air being monitored by the sensors 12A and 12B.

In the afore-cited U.S. Pat. No. 5,026,986 the radon progeny information was obtained by passing at least some of the environment air through a filter and monitoring the radiation of any particles collected thereon with an alpha particle spectrometer. At that time there was no detailed consideration as to the specification of the filter. However, if accurate PAEC information or dose information is desired, special filters are necessary that provide more particle size information.

Figure 3:
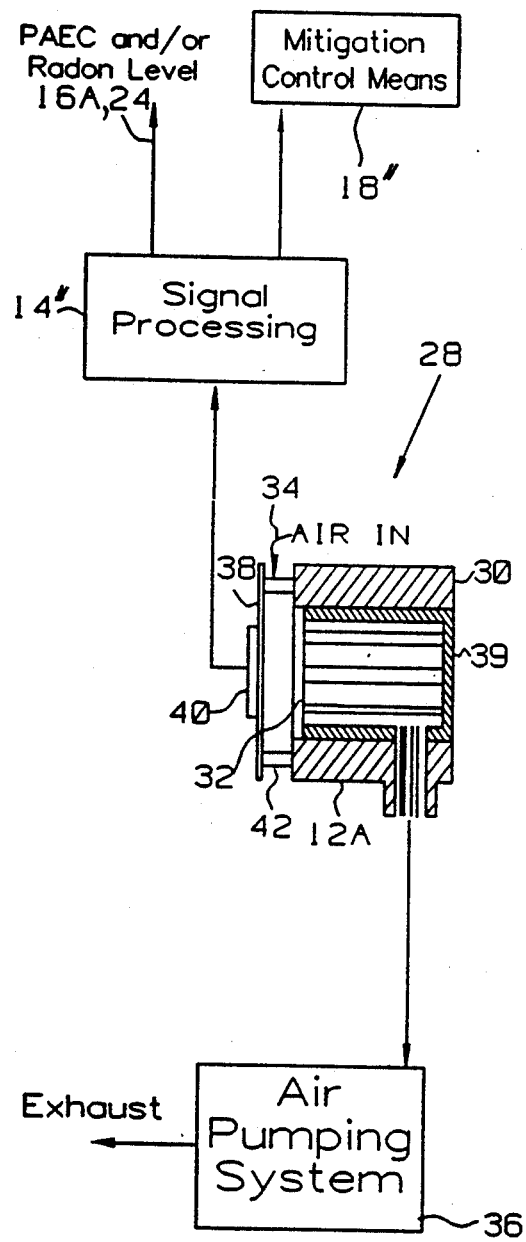
FIG. 3 is a schematic drawing illustrating one embodiment of means for collecting radon progeny and an alpha particle spectrometer and microprocessor for determining PAEC levels and, if desired, for providing a signal to radon mitigation apparatus.

One embodiment of an improved filter and alpha particle detection system is illustrated in FIG. 3 at 28. This system is useful, in particular, for determining PAEC levels in the air and in this respect is very similar to the system 10 illustrated in FIG. 1. As such, there is a detector 12A and a signal processing means or microprocessor 14. There is a body 30 which can be mounted in any desired manner. This body is used to support a filter element 32 that is designed to collect particles of essentially every size from the air that enters at 34. For example, this is a millipore filter, a common paper filter or a fiber filter. The flow of air through the filter 32 is maintained by an air pumping system 36. This pumping system can be a control valve and a simple pump, for example. In the embodiment shown, the filter element 32 is mounted at the end of an open cup-like member 39 that can be removed from the body 30 if the filter element is to be cleaned or replaced. Of course, other structures could be used to achieve this feature. A mounting plate 38 supports a solid state alpha particle detector 40 so that this detector intercepts alpha particles emitted during the decay of radon progeny while trapped on the filter element 32. For example, this detector 40 can be a Model DIAD II having a 450 mm$^2$ area as manufactured by EG&G ORTEC, 199 Midland Road, Oak Ridge, Tenn. 37830. Alternately, an inexpensive detector such as an EG&G Model UV444A photodiode can be utilized to reduce cost. This plate 38 and detector 40 are maintained at a selected distance (e.g., 0.5 cm) from the filter element as by supports 42. The spacing is such as to minimize (to less than 10% for 1 nm particles) any plateout of radiation on surfaces before impaction of the particles upon the filter element 32. Although this FIG. 3 (and FIGS. 4 and 5) shows the signal processing means 14 removed from the detector 40, the two components are conventionally integrated into a single unified structure.

In an operation of the sensor 12 of FIG. 3, a selected rate of air flow through the filter element 32 is established via the pumping system 36. Decays that occur as a result of the deposit of particulates containing radon daughters on the filter element result in alpha particles of the various energies which are determined by the detector 40. The signal output of this detector is inputted to the signal processing means 14, as in FIG. 1, which is programmed to use the alpha particle counts in the selected energy ranges of the daughter products to provide relevant information about health risk, such as signals 16A, 24 of the PAEC (or radon) level, with appropriate signals to any mitigation control means 18. As stated above, such mitigation control means 18 includes, but is not limited to, subsurface ventilators, fans or vents in a building HVAC system.

As stated above, there are applications where dose received by the lung, and particularly the bronchial epithelium, is a desired quantity. Such dose information is a better measure of the health risk to persons in the environment. Due to the natural functions of various portions of the human respiratory system, not all particles containing radioactivity associated therewith have a significance on this risk. In general, the larger of the particles (greater than about 1000 nm) are deposited by inertial impaction upon surfaces of nasal passages where less damage may occur. Very fine particles (a few nm), because they can diffuse across the direction of air flow, also can deposit in initial portions of the respiratory track. A significant portion of particles in the 2-20 nm size range, however, are carried into the tracheobronchial regions where they impinge and give rise to the dose to these sensitive tissues.

Figure 4:
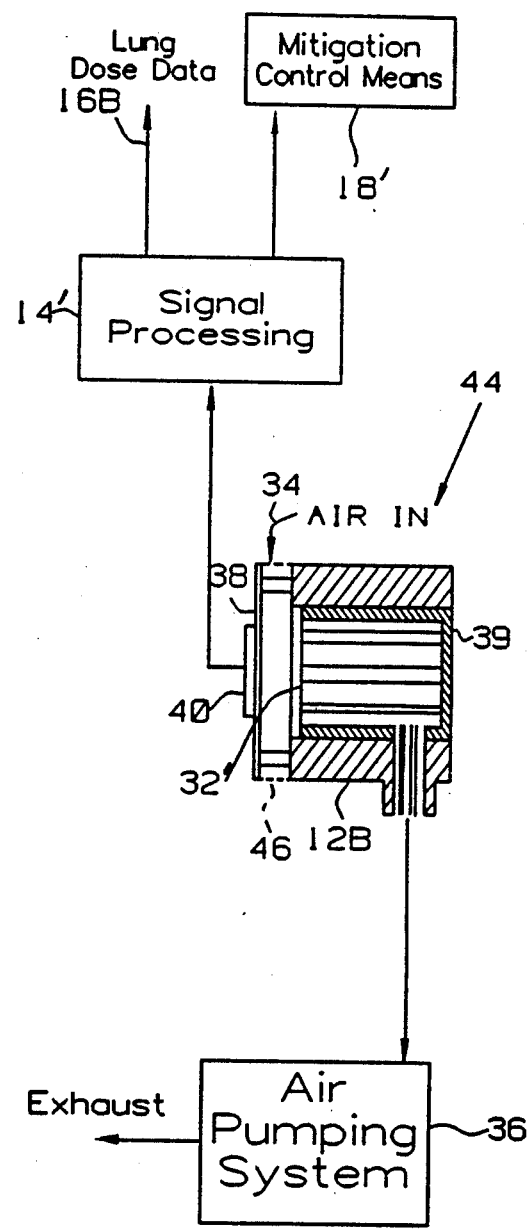
FIG. 4 is a schematic drawing illustrating a means for collecting radon progeny and an alpha particle spectrometer and microprocessor for determining lung dose and, if desired, for providing a signal to radon mitigation apparatus.

A system to determine this lung dose is illustrated at 44 in FIG. 4. The sensor, in this embodiment, is similar in function to that disclosed in "A Measurement System for Rn Decay Product Lung Deposition Based on Respiratory Models", P.K. Hopke and M. Ramamurthi, *Health Physics*. Vol. 58, No. 3 (March), pp. 291-295, 1990, issued Mar. 13, 1990. This system differs from that of FIG. 3 in only two respects so that any identical components carry the same numbers. One of these is the addition of a prefilter element 46 at the air inlet. This prefilter element is sized (e.g., 200 mesh screen) so as to remove particulates that are both large and very small, in a manner similar to the action that naturally occurs in the nasal passages of a person. The air face velocity at this prefilter 46 is typically 7 cm/sec. As a result, particles in the range of a few nm to less than about 1000 nm impinge upon the filter element 32'. The filter element 32' is sized so as to collect the particulates in a manner analogous to that estimated to occur in the tracheobronchial region of the lungs. For example, this can be four layers of 400 mesh screen. This combination requires a face velocity of the filter element 32' of about 12.2 cm/sec to simulate breathing. The prefilter element 46 is sufficiently removed from the region being monitored by the detector 40 such that this detector receives primarily only radiation from the decay of the daughter atoms on particulates retained on filter element 32'. As a result, the signal processing means produces an output signal at 16B that is bronchial (lung) dose data. The signal can also be used for operation of the mitigation control means 18'.

Although there are applications where the individual embodiments of FIGS. 3 and 4 will be useful by themselves, certain advantages will be derived when they are used simultaneously. Such a system is illustrated at 46 in FIG. 5. In essence, this is a combined system using the system 28 of FIG. 3 and system 44 of FIG. 4. However, certain of the elements can be common to both, including the air pumping system 36' so as to achieve a selected air flow rate through the two detectors 12A and 12B. Also, a common signal processing means 14" can be used to process the signals from the detectors of the two sensors. This results in a combination of the information obtained from the individual systems. This includes PAEC level information at 16A, 24, lung (bronchial) dose 16B, and PAEC/lung dose ratio 26. Further, as in the other systems, a signal is available for the operation of mitigation control means 18" on the basis of the PAEC level, the lung dose and/or the radon level.

Figure 5:
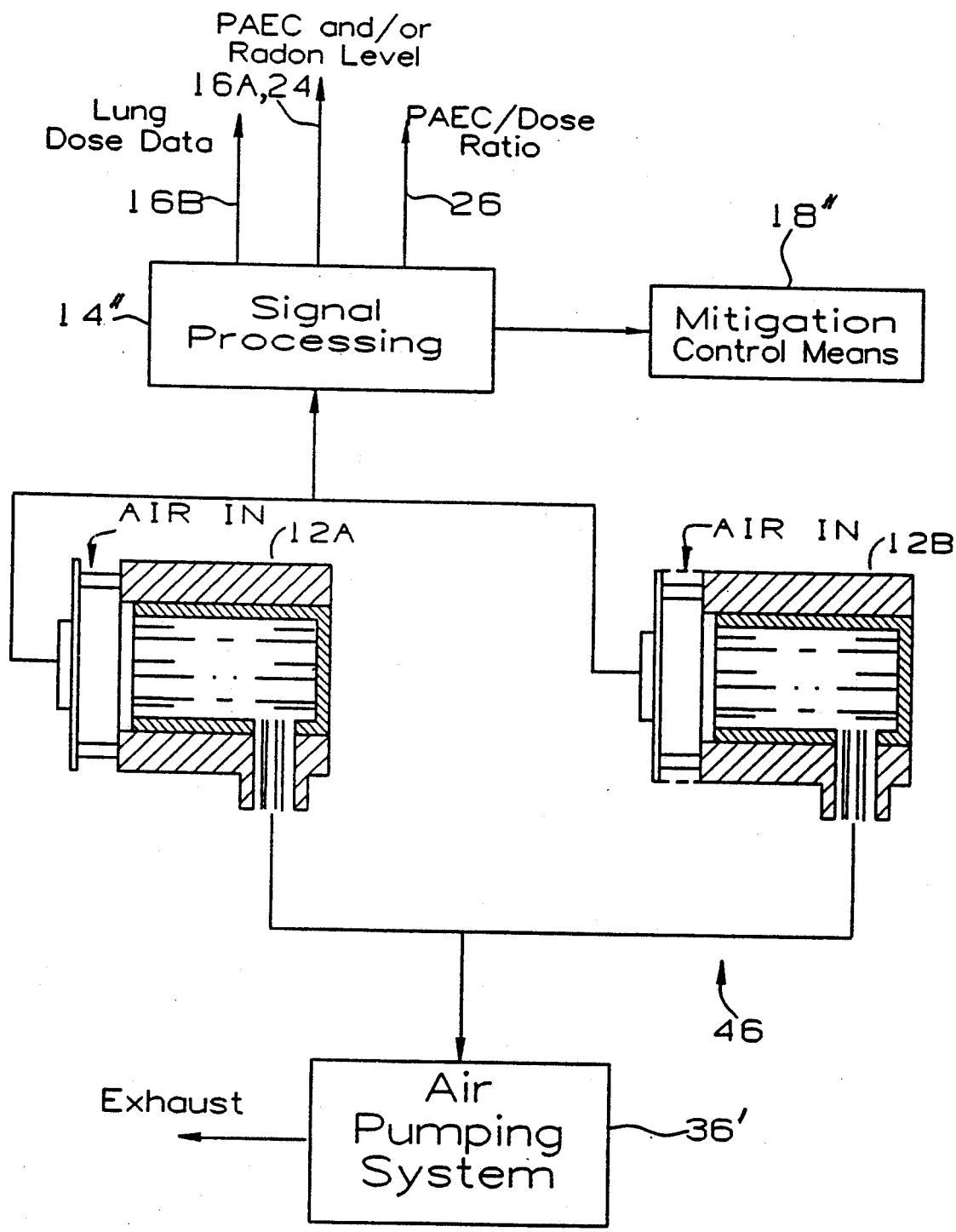
FIG. 5 is a schematic drawing illustrating the combined use of the detector systems of FIGS. 3 and 4 whereby there can be a simultaneous determination of PAEC levels and lung dose data, a determination of a ratio of this information, and providing a signal for radon mitigation if desired.

It will be understood by persons skilled in the art that the structures of FIGS. 3-5 are only illustrative of embodiments of sensors that can be used for determining the PAEC and lung dose information. In any sensor that is used, however, the same functions need to be accomplished so that the detector(s) 40 and any associated equipment determine the alpha particle energies being emitted during the decay of the daughter products retained on the filter element of the sensors.

While preferred embodiment of a radon monitor and control system based on the detection of $^{218}$Po and $^{214}$Po atoms have been described and illustrated, it will be understood that there is no intent to limit the invention to such disclosure. Rather, it is intended to cover all modifications and alternate constructions falling within the spirit and scope of the invention as defined in the appended claims and equivalents thereof.

We claim:

1. A system for the realtime determination of quantities related to health risk due to the level of radon in air within an environment, which comprises:
    a filter element having selected collection characteristics to remove particulate material of selected sizes from said air, said particulate material containing daughter atoms from a decay of said radon, said filter element having a first portion with collection characteristics to retain particulates in a manner simulating collection of particulates in a human nasal cavity, and a second portion with collection characteristics to retain particulates in a manner simulating collection of particulates in a human lung;
    means for drawing at least a selected portion of said air through said filter element at a selected constant flow rate;
    electrical detector means positioned proximate said filter element for measuring energy spectra of radioactive decay of said daughter atoms on said filter element, said electrical detector means producing signals according to selected energy ranges of said daughter atoms; and
    means for acquiring said signals from said electrical detector means, and for processing said signals to convert alpha particle counts in said selected energy ranges to said quantities related to lung dose of said health risk.

2. The system of claim 1 further comprising:
    a second filter element having collection characteristics that cause substantially complete retention of particulates;
    means for drawing at least a selected portion of said air through said second filter element at a selected constant rate;
    second electrical detector means positioned proximate said second filter element for measuring energy spectra of radioactive decay of said daughter atoms on said second filter element, said second detector means producing signals according to selected energy ranges of said daughter atoms; and
    means for acquiring said signals from said second electrical detector means, and for processing said signals to convert alpha particle counts in said selected energy ranges to health risk due to potential alpha energy concentration and total radon concentration in said environment.

3. The system of claim 2 wherein said means for drawing air through said second filter element is said means for drawing air through said filter element, and wherein said means for acquiring signals and processing data from said second electrical detector means is said means for acquiring said signals and processing data from said electrical detector means.

4. The system of claim 3 wherein said means for acquiring signals and processing data computes a ratio of said potential alpha energy concentration to said lung dose.

5. The system of claim 1 wherein said environment is a substantially enclosed environment, further comprising:
   radon mitigation means associated with said environment to effect a decrease in concentration of said radon in said environment; and
   signal transmission means connected between said means for acquiring signals from said electrical detector whereby when said quantity related to health risk exceeds a preselected level, said mitigation means is operated to reduce said radon concentration.

6. A system for the realtime determination of quantities related to health risk due to the level of radon in air within an environment, said air containing particulate material having daughter atoms from a decay of said radon, which comprises:
   a filter element having a first portion and a second portion, said first portion having collection characteristics to retain particulate material from said air in a manner simulating collection of particulates in a human nasal cavity, said second portion having collection characteristics to retain particulate material from said air in a manner simulating collection of particulates in a human lung;
   means for drawing at least a selected portion of said air through said filter element at a selected constant flow rate;
   electrical detector means positioned proximate said second portion of said filter element for measuring energy spectra of radioactive decay of said daughter atoms on said second portion of said filter element, said electrical detector means producing signals according to selected energy ranges of said daughter atoms; and
   means for acquiring said signals from said electrical detector means, and for processing said signals to convert alpha particle counts in said selected energy ranges to said quantities related to said health risk.

7. A system for the realtime determination of quantities related to health risk of lung dose, total radon concentration and potential alpha energy concentration due to the level or radon in air within a substantially enclosed environment and for mitigating said health risk, which comprises:
   a filter element having selected collection characteristics to remove substantially all particulate material of selected sizes from said air, said particulate material containing daughter atoms from a decay of said radon;
   a second filter element having selected collection characteristics to remove particulate material of selected sizes from said air, said second filter element with a first portion having collection characteristics to retain particulates in a manner simulating collection of particulates in a human nasal cavity, and a second portion having collection characteristics to retain particulates in a manner simulating collection of particulates in a human lung;
   means for drawing at least a selected portion of said air through said filter element and said second filter element at a selected constant flow rate;
   electrical detector means positioned proximate said filter element and said second filter element for measuring energy spectra of radioactive decay of said daughter atoms on said filter element and said second filter element, said electrical detector means producing signals according to selected energy ranges of said daughter atoms;
   means for acquiring said signals from said electrical detector means, and for processing said signals to convert alpha particle counts in said selected energy ranges to said quantities related to said health risk or total radon concentration, potential alpha energy concentration and lung dose;
   radon mitigation means associated with said environment to effect a decrease in concentration of said radon in said environment; and
   signal transmission means connected between said means for acquiring signals from said electrical detector means whereby when said quantities related to health risk exceed a preselected level, said mitigation means is operated to reduce said radon concentration.

8. The system of claim 7 wherein said means for acquiring signals and processing data computes a ratio of said potential alpha energy concentration to said lung dose.

* * * * *